May 25, 1965  L. F. WESTPHALEN  3,185,061
MULTIFOCAL CAMERA

Filed Aug. 13, 1962  3 Sheets-Sheet 1

INVENTOR
LEONARD F. WESTPHALEN
BY
ATTORNEYS

May 25, 1965 L. F. WESTPHALEN 3,185,061
MULTIFOCAL CAMERA
Filed Aug. 13, 1962 3 Sheets-Sheet 2

INVENTOR
LEONARD F. WESTPHALEN
BY
ATTORNEYS

INVENTOR
LEONARD F. WESTPHALEN
BY
ATTORNEYS

United States Patent Office 3,185,061
Patented May 25, 1965

3,185,061
MULTIFOCAL CAMERA
Leonard F. Westphalen, 5234 S. Dorchester Ave.,
Chicago, Ill.
Filed Aug. 13, 1962, Ser. No. 216,674
6 Claims. (Cl. 95—45)

This invention relates to cameras and/or attachments therefor and particularly to a camera objective having a range of effective focal lengths.

A principal object of the invention is to provide a camera having an objective of normal focus with means by which its effective focal length can be increased at the convenience of the photographer to permit his taking close up pictures of a distant object, said means to be built into the camera or to comprise an attachment therefor.

Another object of the invention is to provide means and method of modifying a camera having an objective of normal focus for distant objects so as to provide therefor a number of different equivalent focal lengths while maintaining the camera construction simple and its optical system compact and of minimum length.

A further object of the invention is to provide a camera and/or attachment therefor having a fast lens or objective of normal focus with means in the form of an additional lens or lenses which may be optionally combined with the objective to increase its focal length at the election and convenience of the photographer and which will also permit the objective to be used at its normal focus.

Within recent years, so-called zoom lenses having a continuously variable focal length have come into prominence and are receiving much attention from lens designers and manufacturers. However, such lenses necessarily comprise a large number of elements in order to maintain any semblance of a constant image plane as the spacings of the elements are shifted to change the focal length of the combination. The compensations and compromises which must be made and the complicated mechanical interlocking of the movable components necessary to obtain these complex movements of the elements make for a bulky, heavy and costly device which detracts from its appeal to the otherwise highly-interested photographers. The large number of lenses that are required in available zoom lens systems also introduces a problem of light and lens speed, such lens systems being usually confined to an aperture of f/2.8 or poorer. Usually also, although the system may be considered to provide an infinite number of focal length settings, the range within which the magnifications lie is limited, otherwise the system becomes unwieldy. The focusing range of such prior systems is also generally limited to not closer than 8 to 10 feet, whereas my invention allows sharp focusing of an object 3 feet or less from the camera. Also, its construction may be such as to allow the normal focus lens alone to focus a distance of up to twice its focal length, giving an image ratio of 1:1, or image size the same as the object.

It has also been proposed to provide a camera having interchangeable objectives each of a different focal length. These have been provided as separate units which may be removably mounted over the camera aperture. They also may be arranged on a turret indexed to selectively align each of the several objectives with the aperture. Multiplication of objectives is of course expensive and a camera equipped with a turret arrangement of multiple objectives is clumsy to use as well as bulky. The need to continuously replace objectives each time a different magnification of image is required also has its drawbacks.

By the present invention it is proposed to overcome all of the aforesaid disadvantages of the known prior art. In accordance therewith, not only is an objective provided whose focal length may be adjusted through a wide range of settings but also one which comprises a relatively small number of elements and the spacings of which remain small for each of the focal length settings which the objective accommodates, wherefore the total length of the objective is not unduly large for magnification factors up to five times and even greater.

These and other objects of the invention are obtained by inserting or removably locating one or more of a group of negative lenses of different focal power between the objective and the image plane so as to be spaced from the principal plane of the objective a distance equal to less than its focal length. The effect is to relocate the second principal plane of the objective closer to the object, thus lengthening the effective focal length of the objective.

It is a feature of the invention that the effective focal length of the objective is a function of the power of the inserted negative lens, wherefore the spacing of the negative lens from the film plane can be maintained as a constant. Therefore, magnification of the image is obtained by changing the power of the negative lens and the spacing of the objective from the negative lens is adjusted in accordance with the power of the selected negative lens so that the now enlarged image of the distant object is in sharp focus on the film. The distances through which the outer end of the objective must move to obtain different focal lengths therefore can be kept short and so that the forward structure of the camera does not take on an unwieldy size even to achieve large magnification factors.

It is also possible in accordance with the invention to locate the objective at an extreme position from the image plane and to arrange the negative lenses of different focal power on a common mount but in different planes such that, as they are inserted into position behind the objective, they are correctly located to focus an image of the distant object at the film plane. The positioning of each negative lens on the optical axis automatically obtains the desired change in effective focal length without further spatial adjustments of either the objective or the negative lens and each negative lens constitutes the equivalent of an extra interchangeable lens of the same focal length.

It is a further feature of the invention that a construction is provided which allows the photographer to use the objective either in combination with a selected one or more of the negative lenses for close up shots or to use it alone where magnification is not wanted. It is further contemplated that this interchangeable use of the objective lens will be instantly available and will not require breakdown of the camera or rearrangement of its components or structural parts, and all operations or adjustments can be made from the outside of the camera.

Many other objects, advantages and features of the invention will be apparent or will become so from the more detailed description of the invention and preferred embodiments thereof which will now be described.

Referring therefore to the drawings:

FIGURES 4 and 5 illustrate a further embodiment wherein FIGURE 4 illustrates the negative lenses mounted on a turret wheel and FIGURE 5 is a fragmented view of a horizontal section taken through a camera and illustrates the turret wheel in assembled relation therewith;

FIGURES 6 and 7 illustrate still another embodiment of the invention wherein FIGURE 6 illustrates the negative lenses mounted on a removable slide and FIGURE 7 is a fragmented view illustrating the slide in position of use;

FIGURE 8 is a fragmented horizontal sectional view taken through a camera and illustrates a further modification of the invention;

FIGURES 9 and 10 illustrate still another embodiment of the invention wherein FIGURE 9 is a side elevational view and FIGURE 10 is a sectional view taken along lines 10—10 of said figure.

Figure 1:
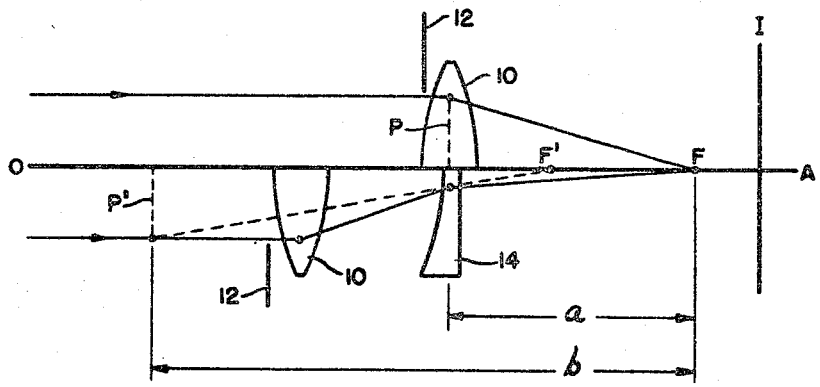
FIGURE 1 is a diagrammatic view which illustrates the invention.

Now referring more specifically to the several views and first to FIGURE 1, the invention will be understood by considering OA as the optical axis of the positive lens 10. As indicated in the upper half of the view, lens 10 receives light rays from the left-hand side and focuses the parallel rays to a point on said optical axis designated F. 12 represents an aperture stop which confines the entrant rays to the useful or best corrected portion of the lens so that an image of a distant object from which the parallel rays emanate will be in good definition at an image forming or film plane located at I behind focal point F. P represents the second principal plane of the lens 10 and the distance which separates its inner section of axis OA from F is considered to be the focal length of the lens 10.

It is well known that if a negative lens is spaced between the positive lens and its point of focus, then parallel light from a distant object entering the positive lens will be refocused at a new point forwardly or further along the optical axis dependent on the focal power of the negative lens and its spacing from the positive lens. The effect is that the second principal plane of the positive lens is thereby moved closer to the object so as to increase the effective focal length of the positive lens. This telephotic principal of optics is employed to advantage in the present invention.

Referring therefore to the lower half of FIGURE 1, it will be seen that positive lens 10 has been moved to a new position along optic axis OA closer to the distant object and so that parallel light rays therefrom normally would be focused at F'. Negative lens 14, however, has been located in the position vacated by the positive lens 10. Being within the focal length of the positive lens 10 it diverts the light rays from point F' to a position forwardly thereof and closer to the image plane I. In the illustrated example, negative lens 14 has been selected to have a power such that it refocuses the parallel light rays received from positive lens and refocuses them at F. It therefore follows that this combination will also produce an image of the distant object at image plane I. However, since the second principal plane of the combination is not at P, but at P', the effective focal length of the combination has been changed from a length "a" to better than twice "a." This length is indicated at "b." For a given field angle, the size of the image which can be produced by an objective is proportional to the distance of the film from the second principal point or primary plane of the objective, that is to say, it is proportional to the focal length of the objective. Therefore, in the second instance, use of the negative lens at 14 produced an image at I which has been magnified to be more than twice the image produced thereon by the positive lens alone. It will be understood that in the foregoing discussion the object being photographed is far distant so that the light rays are considered as emanating from infinity. Any change in field angle which therefore might theoretically result because of the relocation of the positive lens is so slight that it can be ignored.

If the power of the negative lens 14 is changed, so also will the focus of the optical system and therefore the magnification of the image at I. Magnification, therefore, can be largely a function of the power of the negative lens and changes in magnification can be obtained while maintaining the back focus of the system as a constant. In this event, some small amount of adjustment of the positive lens 10 will of course be required to obtain proper focus. Optionally, the negative lens might be axially adjusted the small distance required to obtain refocusing for each of the several possible magnifications.

Figure 2:
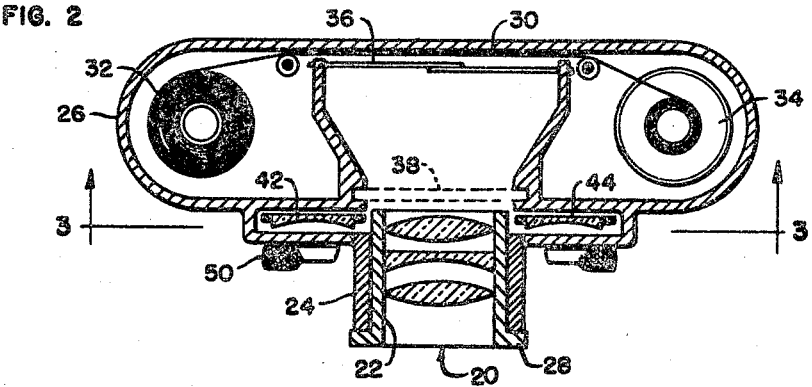
FIGURE 2 is a horizontal sectional view taken through a camera, illustrated in part schematically, and shows one embodiment of the invention.
Figure 3:
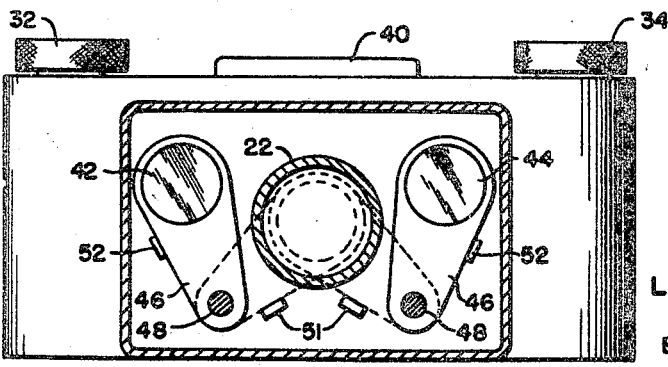
FIGURE 3 is a horizontal sectional view taken along lines 3—3 of FIGURE 2 looking in the direction of the arrows and shows further details in the mounting of the negative lenses.

It is therefore my proposal to provide an optical system for a camera embodying a positive lens of normal focus which may be axially spaced from the film plane for conventional photographs. The camera will also be provided with a plurality of negative lenses each of different power which I arrange so that they may be selectively located on the optical axis of the camera between the positive lens and the film plane when it is desired to take a magnified image of the object. The means employed for supporting the negative lenses and for adjusting their locations into and out of alignment behind the positive lens and on the optical axis thereof may take any one of several forms. For example, referring to FIGURES 2 and 3, a preferred embodiment of the invention is there illustrated as comprising a multi-element objective 20 supported in a tube 22. Objective 20 corresponds to the positive lens 10 of FIGURE 1, the number of elements having been multiplied so that by proper selection of curvatures, spacings, and indices of refraction, an objective may be obtained which is well corrected for coma, spherical and chromatic aberration astigmatism and the like, as is conventional in the art. It is thus to be understood that objective 20 is considered to be a well corrected objective of normal focus, that is, having a focal length equal roughly to the diagonal of the negative film frame and a relatively fast aperture, preferably of f2 or better. The invention is, however, not to be considered limited to an objective of a particular focal length or aperture size. Tube 22 is supported for sliding axial movement in a second tube 24 threadedly connected within the provided aperture of the camera housing indicated generally at 26. The outer end of tube 22 is preferably flared at 28, or is otherwise provided with means for limiting the inward movement of the objective 20. Flared end 28 serves to locate the objective at the proper distance from the film 30 when the objective is to be used at its normal focus position. 32 and 34 represent conventional film spools on which the film is mounted and have the usual operating means associated therewith which locate one frame of the film at a time on the optical axis OA the objective 20. 36 represents a conventional film plane curtain type shutter, although it is to be understood that any other type of shutter mechanism and location therefor may be utilized. 38 represents a supplementary lens or filter which may be inserted through trap door 40 in the top of the camera housing to locate it between the objective 20 and the film plane when the occasion demands. At 42 and 44 are a pair of negative lenses, lens 42 having a different focal power than negative lens 44. As best seen in FIGURE 3, each of negative lenses 42 and 44 is similarly mounted on a support 46 having its lower end fixed to a shaft 48 which extends through a suitable opening provided in the forward wall of the camera housing 26 and which constitutes a bearing for said shaft. On the outer side of the front wall of the camera housing 26, a lever 50 or other appropriate means is affixed to said shaft 48 which may be operated to move a respective one of the negative lenses from its position at rest as illustrated by the full lines in FIGURE 3, to a position in axial alignment with the objective, their latter position being illustrated by dotted lines in FIGURE 3.

Means are also provided at 51 which limit the swing of support 46 so as to assure alignment of the respective negative lens on the optical axis of the objective 20. Stop means may be also provided at 52 against which the supports 46 engage when the negative lenses are in their non-use positions. As illustrated by FIGURES 2 and 3, when the two negative lenses are supported in a non-use position, they are also sufficiently displaced from the optical axis OA of the objective 20 so as to allow uninhibited axial movement of tube 22 to locate objective 20 for normal focusing at the film plane (FIGURE 2). When it is desired to obtain a magnified image of the object at said plane, tube 22 will be withdrawn a distance sufficient to allow one of the negative lenses 42 or 44 to be moved into alignment therebetween and the film plane. This is accomplished by rotating the lever 50. Tube 22 is then adjusted inwardly and outwardly until a clear sharp image is visible in the viewer (not shown) indicating that the objective is spaced from the negative lens for proper focus.

If objective 20 is considered to be a normal focus lens, for example, having a 50 mm. focus and a $f/2$ aperture, and negative lens 42 is considered to have a $-50$ mm. focus and negative lens 44 to have a $-25$ mm. focus, then the camera illustrated by FIGURES 2 and 3 may be considered as having a multi-focal objective comprising a 50 mm. focus $f/2$ lens when the objective is used alone, a 100 mm. focus $f/4$ lens when the objective 20 is used in combination with the negative lens 42 and a 150 mm. focus $f/6$ lens when the objective 20 is used in combination with the negative lens 44. In the above example, the camera is considered as producing 24 by 36 mm. negatives. If the objective 20 were designed as a 75 mm. focus with an $f/2.8$ aperture, as, for example, is conventionally used with cameras making 2¼ inch by 2¼ inch negatives, then, assuming negative lens 42 to be a $-75$ mm. focus and the negative lens 44 to be a $-37\frac{1}{2}$ mm. focus lens, the photographer would have a choice of a 75 mm. focus $f/2.8$ lens, a 150 mm. focus $f/5.6$ and a 225 mm. focus $f/8.4$ lens.

The above two examples are, of course, given merely to illustrate the invention and any other combination of focal lengths and apertures may be selected and obtained by appropriate design of the negative and objective lenses. Also, it will be understood that any number of supports 46 may be provided each with one or more negative lenses so that by proper pivoting thereof a selected one of a series of negative lenses may be positioned on the optical axis of the objective to obtain any desired number of different magnifications. It is also within the scope of the invention to adapt the supports for the negative lenses so that more than one negative lens may be positioned at a time in alignment with the objective that is one behind the other so as to produce further magnifications of the image on the film 30. Thus, in accordance with the invention by proper selection of the powers and number of negative lenses, as well as their spacing from the film plane and each other, an optical system can be provided having equivalent focal lengths ranging from that of the normal focal lens (used without the negative lenses) to ten or more magnifications. The length of the tubes 22 and 24 will, of course, be determined by the choice of powers for the negative lenses 42 and 44 and the focal length of the objective, their lengths being selected to allow the objective to focus sharply on the film plane when used either alone or with any one of the negative lenses.

Although, as thus far described, the objective has been described as mounted in the inner one of a pair of frictionally engaged telescoping tubes, it will be understood that any other arrangement for obtaining axial movement of the objective may be utilized. Other examples for obtaining such movement would include a rack and pinion, a bellows arrangement, also a threaded connection between telescoping tubes.

Figures 4, 5:
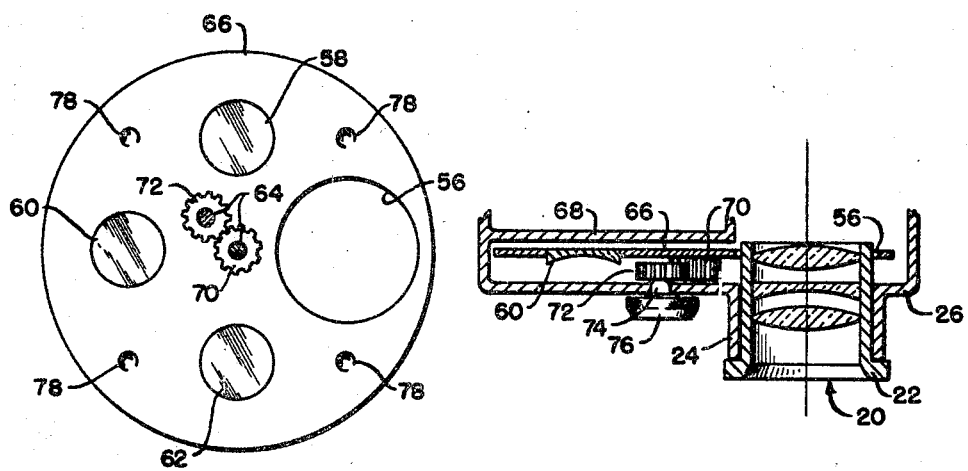

Instead of mounting the negative lens supports so that they may be pivoted into their required right angular relation with the optical axis of the objective, other means may be employed for obtaining movement thereof into and out of alignment with the optical axis. For example, referring to FIGURES 4 and 5, three negative lenses 58, 60 and 62 are shown supported by a turret or wheel 66, which is rotatably mounted as by pin 64 supported between the front wall of the camera housing 26 and wall 68 which forms one side of the film spool enclosures. Wheel 66 also has an enlarged opening at 56 which is large enough to permit passage of tube 22 therethrough when properly aligned therewith. It will be understood that any other means of mounting the wheel may be utilized. The axis of pin 64 about wheel 66 is disposed parallel to optical axis OA of the camera. Opening 56 and negative lenses 58, 60, or 62 are so spaced from said pin that each may be selectively brought into coaxial alignment with the optical axis of the objective 20 by rotation of wheel 66. Its rotation may be effected in any convenient manner. In FIGURES 4 and 5, a pinion 70 is shown mounted on pin 64 and meshing with a second pinion 72 fixed to shaft 74 so as to be turned by rotation of shaft 74. Shaft 74 extends through a provided opening in the front wall of the camera and has a knob 76 fixed to its outer end. By turning knob 76, a selected one of the negative lenses or the opening 56 may be aligned with the objective. Appropriate scale means may be provided on the front wall of the camera housing 26 and knob 76 may have a suitable index which aligns with said scale to indicate the particular magnification for which wheel 66 is set. Indexing means (not shown) such as a spring tensioned pin may also be provided to engage with indents 78 provided in wheel 66 to assure proper axial alignment of the negative lenses and/or opening 56 with objective 20. As previously noted, opening 56 is made sufficiently large that, when aligned with the objective, the objective and its supporting tube 22 may be positioned through the wheel in order to locate the objective at its normal focal position.

Figure 6:
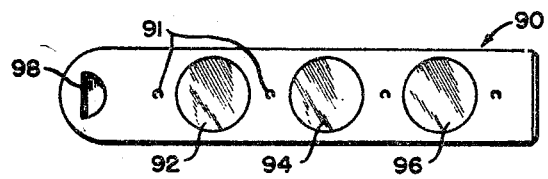

Instead of mounting the negative lenses on swingable mounts (FIGURES 2 and 3) or on a rotatable turret wheel (FIGURES 4 and 5), other suitable means may be employed. For example, the camera may be adapted to receive slide 90 on which one or more negative lenses is mounted. Referring to FIGURE 6, a slide 90 is shown provided with three negative lenses 92, 94 and 96, each of a different power. Said slide is also provided with a recess 98 by means of which it may be conveniently grasped for insertion through a suitable opening in the side or top of the camera to engage in a rim or other guide means which would locate the negative lenses at a constant distance from the film plane corresponding to the back focus of the objective 20. Spring pressed pin or detents (not shown) are also provided to engage in appropriately arranged indents 91 to center the negative lenses on axis OA and in alignment between the objective 20 and the film plane.

Figures 7, 8:
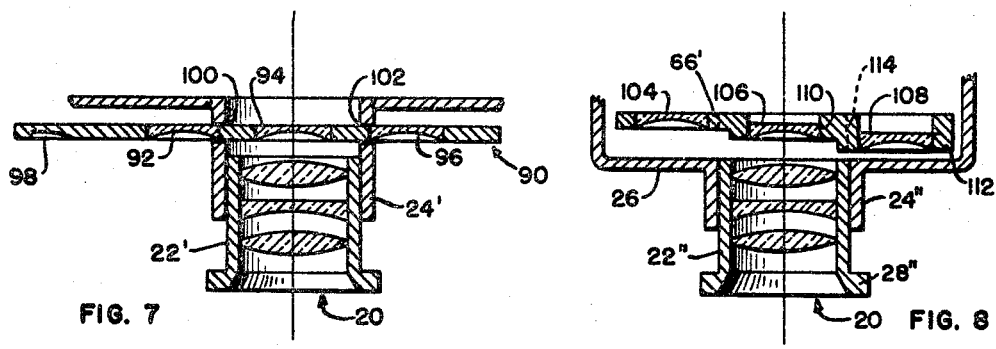

The invention is also equally well adapted as an attachment for a conventional camera. Referring to FIGURE 7 the objective 20 is mounted by a tube 22' telescopically arranged within a tube 24' corresponding to tube 24 of FIGURE 2. Tube 24 is externally threaded at one end so that it may be removably mounted in the aperture of the camera housing 26 and is provided with a pair of aligned slots 100 and 102 of a dimension to receive negative supporting slide 90 for aligning the negative lenses on optical axis OA and at right angles thereto. Tube 22' is of sufficient length that it can carry objective 20 within the aperture of the camera housing 26 sufficiently to locate it at its normal focus position. When combined with an attachment, the negative lenses are not necessarily supported at a distance corresponding to the back focus of the objective at its normal focus position. However, the negative lenses are nevertheless located in a common plane and one which is at a fixed position from the film plane so that the magnification of the image is still essentially a function of the power of the selected negative lens, the objective 20 again being adjusted by inward and outward movement of tube 22', only the small amount necessary to obtain sharp focus of the magnified image on the film.

As previously indicated, slide 90 also may be mounted within the housing of the camera. In this event slide 90 might be provided with an opening of sufficient diameter which would allow supporting tube 22' and its objective 20 to be passed therethrough as in the embodiment of FIGURES 4 and 5.

Conversely, an attachment could be provided wherein tube 24' would be provided with a turret wheel corresponding to wheel 66 of FIGURES 4 and 5. Many other arrangements will be recognized as possible for mounting negative lenses and/or actuating their positioning into and out of axial alignment with the objective whether the same are arranged as an attachment for a camera or as an integral part of the camera. All of such arrangements are intended to be included within the scope of the invention.

As thus far described, some axial adjustment of the objective is necessary once the negative lens has been located in alignment therewith. This is to obtain sharpening of the focus on the film plane. However, it would be possible to hold the position of the objective at a constant distance from the film plane for each of the different powers of the negative lenses, if some compensating factor were introduced.

Referring to FIGURE 8, a further embodiment of the invention is there illustrated in a camera having a housing 26 within which is mounted a wheel 66'. Said wheel corresponds to wheel 66 of the embodiment of FIGURES 4 and 5 and is rotatably mounted to the camera wall housing in a similar manner. Within the camera aperture are a pair of telescoping tubes 22" and 24", the latter being shown as an integral part of the camera housing 26. Inner tube 22" supports the objective 20. In this embodiment, negative lenses 104, 106 and 108 do not lie in a common plane. For example, negative lens 106 is shown mounted within a rim portion 110 which protrudes from the surface of the wheel. Negative lens 106 therefore lies in a plane a distance to the left of the plane in which negative lens 104 is supported. Negative lens 108 is also supported in a projecting rim portion 112 but so that it lies in a plane still farther to the left. In this embodiment, objective 20 is considered to be adjustable between two positions, its outer position illustrated by FIGURE 8 where tube 22" is shown fully extended, and an inner position which it reaches when the tube 22" is moved through opening 114 provided in wheel 66', to the limit permitted by its flared end 28". At said inner position of the tube 22", the objective 20 is considered to be located at its position for normal focus. When it is desired to take magnified pictures of a distant object, tube 22' is withdrawn from said inner position to the position illustrated in FIGURE 8. In this position of tube 22" wheel 66' can be rotated to selectively align one of the negative lenses with the objective. As aforedescribed, each of the negative lenses 104, 106 and 108 lies in a different plane. This plane has been calculated in accordance with the power of the negative lens and the outer position of the objective 20 so that when rotated into axial alignment with the positive lens or objective 20, it will also be located at a distance so as to compensate and/or correct for out-of-focus condition, and thereby eliminating the need for further axial adjustments of the objective.

Figure 9:
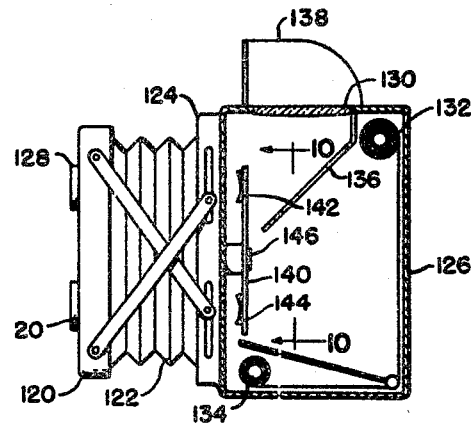
Figure 10:
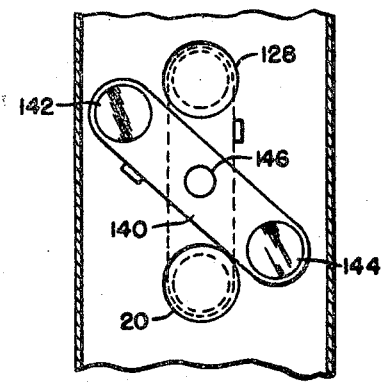

Referring to FIGURES 9 and 10, the invention is there illustrated as embodied in a so-called twin lens reflex camera. In said views 20 represents the objective supported by lens board 120 on the forward end of a bellows 122 which can be folded inwardly to locate lens board 120 against or within a recessed portion of the supporting frame 124 on the forward side of the camera housing 126. 132 and 134 represent film supporting reels corresponding to reels 32 and 34 of FIGURE 1, for example. Lens board 120 also supports a focusing lens 128 corresponding to the objective 20 which focuses an image of the object to the ground glass viewing screen 130 by means of a reflector 136. Such a camera is usually provided with a focusing hood 138 and may be equipped with either a lens shutter or a focal plane shutter. On the film plane side of frame 124 is supported member 140 (FIGURE 10) having negative lens 142 and 144 of equal power mounted in its opposite ends. Member 140 is mounted on frame 124 to swing about a pivot connection 146 equidistantly spaced between the optical axes of the objective 20 and focusing lens 128. Appropriate operating means are provided by which said member 140 may be swung about its connection 146 to optionally locate the negative lenses on the optical axes of said objective and focusing lenses (shown in dotted lines) or to one side thereof (shown in full lines). In the extended position of the bellows 122 the objective 20 and focusing lens 128 are properly positioned so that with the negative lens aligned on their optical axes, a magnified image of a distant object will be focused on the film plane and also visible in the ground glass 130. With the negative lenses moved to one side of said axis and the bellows folded, the objective 20 and focusing lens 128 are spaced from the film plane and ground glass viewing screen, respectively, for normal focusing of near and far distant objects.

Figure 11:
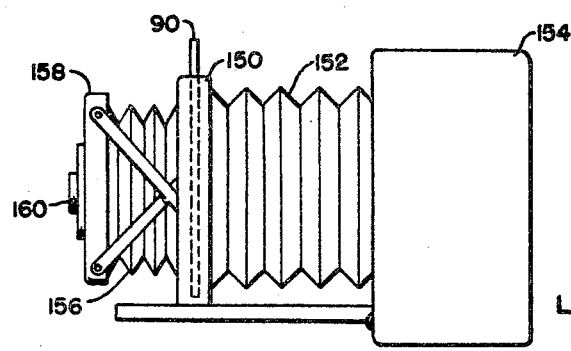
FIGURE 11 illustrates a still further embodiment of the invention and using the slide type mounting of negative lenses as illustrated in FIGURE 6.

In FIGURE 11, a press camera is shown modified in accordance with the present invention. Such a camera is conventionally provided with a lens board 150 mounted on the forward end of a bellows 152 which may be unfolded to locate an objective supported by the lens board 150 at the proper distance from the film plane with the camera housing 154 for normal focusing of near or far objects. In accordance with the present invention such a camera is modified by mounting a second bellows 156 on the forward end of lens board 150 and providing a second lens board 158 on the forward end thereof to support the objective 160. Lens board 150 is modified by providing it with means by which a negative lens may be located on the optical axis of the objective 160. The negative lens may be mounted in a slide 90 such as illustrated in FIGURE 6 or it may be mounted on a turret wheel as in FIGURE 4, a pivoted support as in FIGURE 3, or other convenient means may be employed, lens board 150 being suitably constructed in accordance with the particular support provided for the negative lens or lenses. When bellows 156 is folded to locate lens board 158 against lens board 150 and with no negative lens, the objective 160 is located by adjustment of bellows 152 for normal focusing on near and far objects. However, the objective may be located forwardly of lens board 150 by expanding bellows 156 and locating a negative lens in the lens board 150 on the optical axis of the objective to obtain magnification of an image of a distant object focused by the objective 160 at the film plane.

From the above description of several embodiments of the invention, it will be apparent that all of the objects, advantages and features of the invention have been demonstrated as obtainable in a convenient, simple, and entirely practical manner. Thus, in accordance with the invention, a high speed camera lens of short focus may be utilized in combination with means such as negative lenses of different focal powers which will allow a wide range of magnifications also at relatively wide apertures. For example, where an objective having an aperture of $f/1.4$ is employed, it is possible, according to the invention, to obtain a 2 magnification factor at $f/2.8$; a 3 magnification factor at $f/4.2$; a 4 magnification factor at $f/5.6$; and an 8 magnification factor at $f/11.2$. Furthermore, such a range of magnification factors can be obtained with practically no increase in the size of the camera, and with a very short travel of the objective. Furthermore, the invention may be embodied either in a camera or in an attachment therefor.

Thus having described my invention, I claim:

1. In a camera having a film plane, the combination of a housing enclosing said film plane and including a pair of telescoping members axially aligned with said film plane, the first of said telescoping members being mounted on the housing, the second being axially adjustable within the first member, and an objective of given focal length mounted within the second of said telescoping members so as to be axially aligned with the film plane, said second member being adjustable axially inwardly of the first member toward the film plane so as to locate the objective at a first position spaced in front of the film plane where it is effective alone to focus an image of an object on the film plane, said second member being adjustable axially outwardly of the first member to axially move the objective away from said first position to an alternate position more axially remote from the film plane, at least one supplementary negative lens and supporting structure therefor, said housing having a portion thereof defining an entrance adjacent said first position of the objective through which said negative lens and its supporting structure are movable in a plane transversely of the axis of the telescoping members to locate the negative lens between the objective and film plane in axial alignment therewith when the objective has been moved by the second member to its alternate position, the second member being in the path of movement of the negative lens supporting member when the objective is at said first position to inhibit movement thereof and location of the negative lens in axial alignment with the objective, whereby the objective is used alone at said first position to focus an image of an object at said film plane, and the negative lens having a power such as to shift the second principal plane of the combination of the negative lens and objective forwardly of the location of the second principal plane of the objective when used alone whereby to magnify the image of an objective focussed by the combination over that focussed by the objective when used alone at said first position.

2. In a camera having a film plane, the combination of a housing enclosing said film plane, supporting structure mounted on said housing in front of said film plane, said supporting structure comprising a pair of members axially aligned with said film plane, the first member being fixed to the housing and the second being carried by the first and axially adjustable with respect to the first member toward and away from the film plane, an objective of given focal length supported by the second member so as to be axially aligned with the film plane, said second member being adjustable in a direction toward the first member to locate the objective at a first position spaced in front of the film plane where it is effective alone to focus an image of an object on the film plane, said second member being adjustable away from the first member to axially move the objective out of said first position to an alternate position more axially remote from the film plane, a plurality of supplementary negative lenses each of a different power, means mounted on said housing for supporting said negative lenses in positions laterally of said first position, said means being operable from externally of the housing so as to selectively locate each said negative lenses in said first position and axially aligned between the objective and film plane when the objective has been moved by the second member to its alternate position, the second member being in the path of movement of said negative lens moving means when the objective is at said first position to prevent the operation thereof whereby the objective is used alone at said first position to focus an image of an object to said film plane, and the power of each said negative lens being such whereby each negative lens differently magnifies the image of an object focussed by the combination over that focussed by the objective when used alone at said first position and provides a series of effective focal lengths of which the focal length of the objective comprises one.

3. In a camera having a film plane, the combination of a housing enclosing said film plane, supporting structure mounted on said housing in front of said film plane, said supporting structure comprising a pair of members axially aligned with said film plane, the first member being fixed to the housing and the second carried by the first and adjustable with respect to the first member for axial movement thereof toward and away from the film plane, an objective of given focal length supported on the second member so as to be axially aligned with the film plane, said second member being adjustable on the first member in a direction toward the image plane to locate the objective at a first position spaced in front of the film plane where it is effective to focus an image of an object on the film plane, said second member being adjustable on the first member in a direction away from said image plane to axially move the objective out of said first position to an alternate position more axially remote from the film plane, a pair of supplementary negative lenses, each of a different power, mounted within the housing to swing from a position of rest to one side of said first position of the objective into said first position and axially aligned with the film plane, and means operable from externally of the housing to swing said negative lenses about their said pivot so as to selectively locate each said negative lenses in said first position and axially aligned between the objective and film plane when the objective has been moved by the second member to its alternate position, the second member being disposed in the path of movement of the negative lens when it is adjusted to locate the objective at said first position, the negative lenses being thereby held in their position of rest whereby the objective is used alone at said first position to focus an image of an object on said film plane, and the power of each said negative lens being such whereby each negative lens differently magnifies the image of an object focussed by the combination over that focussed by the objective when used alone at said first position and provides a series of effective focal lengths of which the focal length of the objective comprises one.

4. In a camera having a film plane, the combination of a housing enclosing said film plane, supporting structure mounted on said housing in front of said film plane, said supporting structure comprising a pair of members axially aligned with said film plane, the first members being fixed to the housing and the second being carried by the first and axially adjustable with respect to the first member toward and away from the film plane, an objective of given focal length supported on the second member so as to be axially aligned with the film plane, said second member being adjustable in a direction toward the first member to locate the objective at a first position spaced in front of the film plane where it is effective to focus an image of an object on the film plane, said second member being adjustable on the first member in a direction away from the image plane to axially move the objective out of said first position to an alternate position more axially remote from the film plane, a wheel rotatably mounted within said housing to be turned about an axis disposed to one side of said first position of the objective through a plane disposed normal to the axis of the objective and including said first position, said wheel including an opening through which the second member extends when the objective is located at said first position and which prevents turning of the wheel whereby the objective is used alone at said first position to focus an image of an object on the film plane, said second member being withdrawn therefrom to allow turning of the wheel when the objective is located at its alternative position, said wheel further containing a plurality of circumferentially spaced negative lenses each of a different power and adapted to be located in said first position by turning of the wheel, means operable from externally of the housing to turn said wheel so as to selectively locate each said negative lenses in said first position and axially aligned between the objective and film plane when the second member has been withdrawn from said opening to locate the objective in its alternate position, and the power of each said negative lenses being such whereby each differently magnifies the image of an object focussed by the combination over that focussed by the objective when used alone at said first position and provides a series of effective focal lengths of which the focal length of the objective comprises one.

5. In a camera having a viewing screen and a film plane, the combination of a housing for supporting said viewing screen in one wall and enclosing said film plane, supporting structure mounted on said housing in front of said film plane, said supporting structure comprising a first member axially aligned with said film plane, a second member carried by the first and axially adjustable with respect to the first member toward and away from the film plane, an objective of given focal length supported on the second member so as to be axially aligned with the film plane, a focussing lens supported on said second member in the plane of the objective and offset therefrom for simultaneously focussing an image of the object to which the objective is directed onto the viewing screen, said second member being adjustable on the first member toward the film plane to locate the objective at a first position spaced in front of the film plane where it is effective to focus an image of an object on the film plane, the focussing lens being simultaneously moved to where it is effective to project an image of the viewed object to the viewing screen, said second member being adjustable on the first member in the opposite direction to simultaneously axially move the objective and focussing lens out of said first position to an alternate position more axially remote from the film plane, a pair of supplementary negative lenses of the same power, means supporting said negative lenses within the housing for simultaneous movement into and out of said first position, said means being operable from externally of the housing to selectively locate each said negative lenses in a plane including said first position, one axially aligned between the objective and film plane and the other axially aligned between the focussing lens and viewing screen, when the objective has been moved by the second member to its alternate position, the second member being in the path of movement of said supporting means for the negative lenses when the objective is at said first position to inhibit such location of the negative lenses whereby the objective is used alone to focus an image on the film plane, and the power of said negative lenses being such whereby the image of an object focussed by the combination on the film plane is magnified over that focussed by the objective when used alone at said first position and is simultaneously viewable in the viewing screen at the same magnification.

6. In a camera having a film plane, a camera housing having a front wall spaced forwardly of said film plane, a first lens support carried by said front wall, an objective of positive focal length mounted on said first lens support so as to be in axial alignment with said film plane, said first lens support being axially adjustable on said front wall inwardly toward the film plane to an inner position where the objective is effective to focus an image of a viewed object on the film plane, a second lens support movably mounted within the camera housing and supporting at least one negative lens, said second lens support being movable through a plane parallel to said film plane so as to selectively relocate the negative lens between a one locus outside the optical path of the objective and a second locus within said optical path where it is axially aligned with the objective and film plane, said first lens support being in the path of movement of said second lens support when located in its second first position so as to inhibit movement of the second lens support and maintain the negative lens out of said optical path, the objective being thereby located for use alone when at said first position to focus an image of the viewed object on the film plane, said first lens support being axially adjustable outwardly from its said first position to an outer position where the objective is more remote axially from the film plane, said second lens support being thereupon movable through said plane to locate the negative at its second locus in the optical path of the objective in axial alignment therebetween and the film plane, said negative lens being adapted when in said second locus to cooperate with the objective to focus an image of the viewed object on the film plane which is magnified over that focussed by the objective when used alone at said first position.

References Cited by the Examiner
UNITED STATES PATENTS

| | | | |
|---|---|---|---|
| 2,482,571 | 9/49 | Arnold | 95/44 |
| 2,906,172 | 9/59 | Klemt | 95—45 X |
| 2,995,074 | 8/61 | Schmuck | 95—45 |
| 3,024,714 | 3/62 | Keznickl | 95—44 |
| 3,051,052 | 8/62 | Bergstein | 88—57 |
| 3,083,628 | 4/63 | Tsugawa | 95—44 |

NORTON ANSHER, *Primary Examiner.*

JOHN M. HORAN, *Examiner.*